United States Patent [19]
Yoshida

[11] Patent Number: 5,890,806
[45] Date of Patent: Apr. 6, 1999

[54] DATA COMMUNICATION APPARATUS AND METHOD FOR TRANSMITTING RECEPTION DATA TO A TRANSMISSION SIDE BASED ON A TRANSMISSION MODE

[75] Inventor: Takehiro Yoshida, Tokyo, Japan

[73] Assignee: Canon Kabushiki Kaisha, Tokyo, Japan

[21] Appl. No.: 768,610

[22] Filed: Dec. 18, 1996

[30] Foreign Application Priority Data

Jan. 11, 1996 [JP] Japan ..................................... 8-019302

[51] Int. Cl.[6] .................................................. H04M 11/00
[52] U.S. Cl. ...................................... 379/100.06; 358/439
[58] Field of Search ......................... 379/100.06, 100.05, 379/100.08, 100.09, 100.14–100.17, 100.01; 358/400, 403, 407, 434, 439, 440, 468

[56] References Cited

U.S. PATENT DOCUMENTS 5,175,634 12/1992 Matsuzaki ........................... 379/100.09
5,291,302 3/1994 Gordon et al. ..................... 379/100.06

FOREIGN PATENT DOCUMENTS 2-280570 11/1990 Japan .
5-244380 9/1993 Japan .

*Primary Examiner*—Wing F. Chan
*Attorney, Agent, or Firm*—Fitzpatrick, Cella, Harper & Scinto

[57] ABSTRACT

A data communication apparatus receives data transmitted from a transmission side in one of a plurality of transmission modes and determines which of the plurality of transmission modes was used to transmit the received data. The apparatus also discriminates a condition on which information related to the received data should be transmitted back to the transmission side, the condition varying in accordance with which transmission mode was determined. Then information corresponding to reception data of a plurality of receptions is transmitted collectively back on the basis of the discriminated condition.

18 Claims, 9 Drawing Sheets

DATA COMMUNICATION APPARATUS AND METHOD FOR TRANSMITTING RECEPTION DATA TO A TRANSMISSION SIDE BASED ON A TRANSMISSION MODE

BACKGROUND OF THE INVENTION

1. Field of the Invention

The present invention relates to data communication apparatus and method, and more particularly to data communication apparatus and method for receiving data transmitted from a transmission side and further notifying the transmission side that the data was received.

2. Related Background Art

Conventionally, it has been known a facsimile apparatus which has a function for transmitting, in a case where data transmitted from a transmission-side apparatus was correctly received, data representing a reception confirmation notification for notifying such a fact that the data was correctly received, to the transmission-side apparatus. In such the facsimile apparatus, when the data reception and a data recording terminate, a call is immediately generated to the transmission-side apparatus to transmit the data representing the reception confirmation notification.

However, in such the conventional facsimile apparatus, even if information are received from the same transmission-side apparatus in a short time lag, the call is generated and the reception confirmation notification is transmitted every time the information is received. For example, in a case where the two information are received in the short time lag, the call generation and the transmission are respectively performed twice independently. Therefore, there has been room for save in a communication cost, improvement in line efficiency and the like.

SUMMARY OF THE INVENTION

An object of the present invention is to provide data communication apparatus and method which eliminated above-mentioned problems.

An another object of the present invention is to provide data communication apparatus and method which can reduce a communication cost in case of notifying a transmission side that data was received.

A further another object of the present invention is to provide data communication apparatus and method which can improve line efficiency in case of notifying the transmission side that the data was received.

A further another object of the present invention is to provide data communication apparatus and method which can perform, in case of notifying the transmission side that the data was received, a notification such that information management becomes easy in the transmission side to which the notification was performed.

The above and other objects of the present invention will become apparent from the following detailed description when read in conjunction with the accompanying drawings.

DETAILED DESCRIPTION OF THE PREFERRED EMBODIMENTS

Hereinafter, the present invention will be explained in detail on the basis of embodiments illustrated in the accompanying drawings.

First Embodiment

Figure 1:
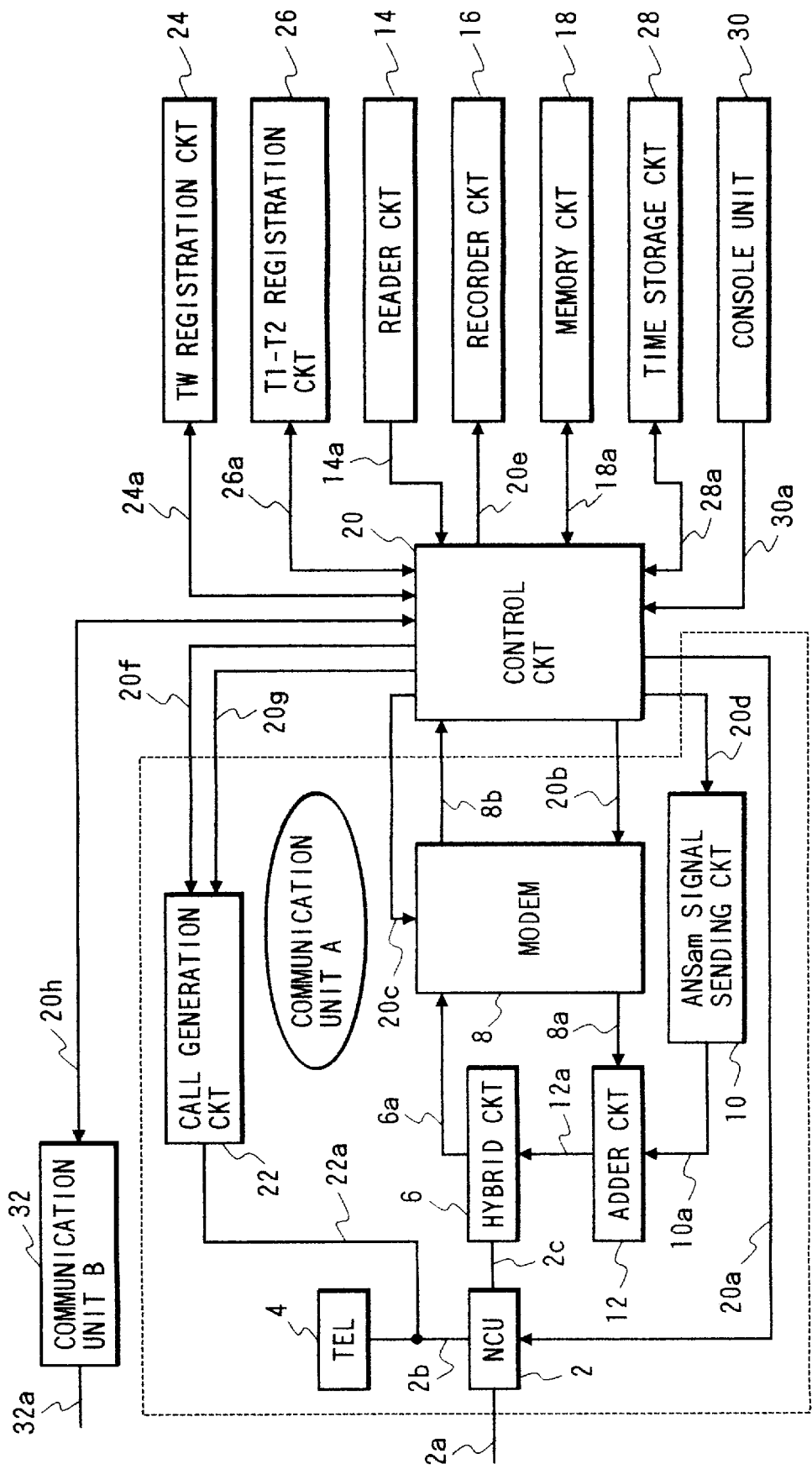
FIG. 1 is a block diagram showing structure of a facsimile apparatus according to an embodiment of the present invention.

FIG. 1 is a block diagram showing a facsimile apparatus according to one embodiment of the present invention.

In FIG. 1, reference numeral 2 denotes a network control unit (NCU) which connects a telephone network to a line terminal to be used in a data communication and the like, performs connection control of a telephone exchange network, performs switching of a data communication path, and holds a loop. Further, the NCU 2 connects a telephone line 2a to a side (2b) of a telephone 4 used for talking when a signal level (on signal line 20a) from a control circuit 20 is "0", while connects the telephone line 2a to a side (2c) of the facsimile apparatus used for facsimile communication when the signal level is "1". In a stand-by state, the telephone line 2a is being connected to the side of the telephone 4.

Reference numeral 6 denotes a hybrid circuit which separates a transmission-system signal and a reception-system signal from each other, sends a transmission signal from an adder circuit 12 to the telephone line 2a via the NCU 2, receives a signal from a communication partner side via the NCU 2, and sends the received signal to a modem 8 via a signal line 6a.

Reference numeral 8 denotes the modem which performs modulation and demodulation on the basis of ITU-T Recommendations V.8, V.21, V.27ter, V.29, V.17 and V.34. In the modem 8, each transmission mode is designated based on a signal input via a signal line 20c. The modem 8 modulates a signal input via a signal line 20b to output modulation data to a signal line 8a, while demodulates the reception signal input via the signal line 6a to output demodulation data to a signal line 8b.

Reference numeral 10 denotes a circuit which sends an ANSam signal. The circuit 10 sends the ANSam signal to a signal line 10a in a case where a signal of which level is "1" is being output to a signal line 20d, while does not send the ANSam signal to the signal line 10a in a case where the signal of which level is "0" is being output to the signal line 20d.

Reference numeral 12 denotes the adder circuit which adds information from the signal line 8a and information from the signal line 10a to each other, and then outputs an added result to a signal line 12a.

Reference numeral 14 denotes a reader circuit which outputs to a signal line 14a image data obtained by reading an original image.

Reference numeral 16 denotes a recorder circuit which records information output to a signal line 20e sequentially for each line (i.e., outputs as visible information on a recording paper).

Reference numeral 18 denotes a memory circuit which is used for storing non-encoded information (i.e., information which is not yet encoded) of the image data from the reader circuit 14, encoded information, information received via the telephone line 2a, information obtained by decoding such the received information, and the like.

Reference numeral 20 denotes the control circuit which controls various operations of the facsimile apparatus. Details of such controls will be described later. A program to be used by the control circuit 20 for performing the control has been stored in the memory circuit 18, whereby the control circuit 20 controls the facsimile apparatus on the basis of the stored program.

Reference numeral 22 denotes a call generation circuit which sends, when a call-generation instruction pulse is sent to a signal line 20g, a selection signal to a signal line 22a in response to telephone number information which has been output to a signal line 20f.

Reference numeral 24 denotes a circuit which registers, via a signal line 24a, a time TW from a time that output of memory reception information terminates to a time that a reception message (i.e., reception confirmation notification) is sent to a transmission-side facsimile apparatus (to be referred as transmission-side apparatus hereinafter).

Reference numeral 26 denotes a time registration circuit which registers via a signal line 26a a period of time from a time T1 to a time T2, during which the reception message is not sent to the transmission-side apparatus.

Reference numeral 28 denotes a time storage circuit which stores, via a signal line 28a, a transmission destination of the reception message and a time until the reception message is produced, which are corresponding to a reception number (i.e., unique number added for each reception).

Reference numeral 30 denotes a console unit which includes a one-touch dial, an abbreviation dial, a ten key, an asterisk "*" key, a sharp "#" key, a registration key for instructing the registration into the register circuit 24, a registration key for instructing the registration into the register circuit 26, a set key, a start key, and other function keys. Information based on depression of each key is output to a signal line 30a.

Reference symbol A denotes a communication unit which is composed of the blocks 2, 4, 6, 8, 10, 12 and 22. Reference numeral 32 denotes a communication unit B which is composed of substantially the same blocks as in the communication unit A. A signal line 32a is a telephone line, and a signal line 20h includes signal lines which are corresponding to the signal lines 20a, 20b, 20c, 20d, 20f, 20g and 8b.

In case of transmitting to the transmission-side apparatus the reception message representing that the reception information was correctly received, the control circuit 20 transmits the plurality of reception messages at one time. In this case, the reception information are all subjected to memory reception (i.e., stored in the memory circuit 18) and print output, and then the reception message is transmitted after elapsing the time TW. At that time, if the print output of the plural memory reception information from the same destination terminated, transmissions of these reception messages are collectively performed. The time TW can be registered by a user. Hereinafter, an example of the above control will be explained with reference to flow charts shown in FIGS. 2 to 6.

In this example, it is described a case where the register circuit 26 and the communication unit B 32 are not used.

Figure 2:
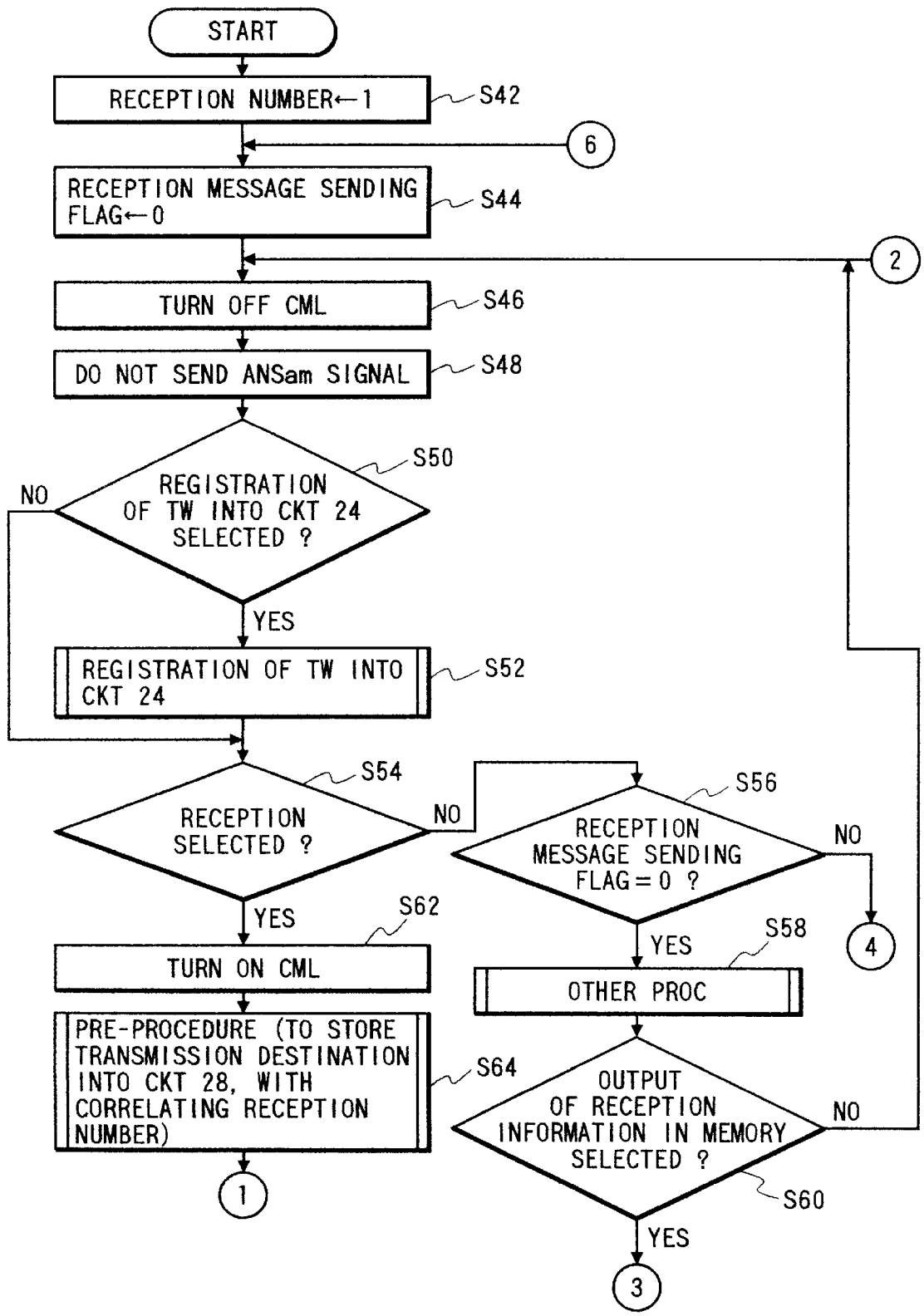
FIG. 2 is a flow chart of a process of a first embodiment which is performed by a control circuit illustrated in FIG. 1.

In FIG. 2, "1" is set as the reception number in a step S42, and "0" is set in a reception message sending flag in a step S44. In a step S46, the signal of which level is "0" is output to the signal line 20a to turn off a CML (connect modem to line) (i.e., to connect the telephone line 2a to the side of the telephone 4). Further, in a step S48, the signal of which level is "0" is output to the signal line 20d not to send the ANSam signal.

In a step S50, it is judged according to the information from the signal line 30a whether or not it is selected to register the time TW (from the time that reception information in the memory circuit 18 is output to the time that the reception message is sent). If selected, the flow advances to a step S52 to register the time TW. On the other hand, if not selected, the flow advances to a step S54.

In the step S54, it is judged based on the call reception whether or not the reception is selected. If selected, the flow advances to a step S62 to output the signal of which level is "1" to the signal line 20a so as to turn on the CML (i.e., to connect the telephone line 2a to the side (2c) of the facsimile apparatus).

In a subsequent step S64, a predetermined pre-procedure is executed based on ITU-T Recommendations T.30. In the pre-procedure, the transmission destination (based on reception of a TSI (transmitting subscriber identification) signal) of the reception message is stored in the circuit 28 via the signal line 28a, with correlating it to the reception number. Then, the flow advances to a step S66 in FIG. 3.

In the step S66, an image signal is received and stored in the memory circuit 18. Subsequently, a post-procedure is executed (step S68), and in a step S70 the signal of which level is "0" is output to the signal line 20a to turn off the CML. Then, in a step S72, the reception number is subjected to increment by one, and the flow returns to the step S46 in FIG. 2.

If the reception has not been selected in the step S54 in FIG. 2, the flow advances to a step S56. In the step S56, it is judged whether or not the reception sending message is "0", i.e., whether or not sending of the reception message is unnecessary. If the reception message sending flag is "0", the flow advances to a step S58 to perform other processes, while if the reception message sending flag is "1", the flow advances to a step S78 in FIG. 4.

In a step S60, it is judged based on the information output from the signal line 30a whether or not it is selected to perform the print output of the reception information in the memory circuit 18. If the print output has been selected, the flow advances to a step S74, while if not selected, the flow returns to the step S46.

In the step S74, the reception information corresponding to the designated reception number is printed and output. In a step S76, the time TW stored in the circuit 24 is recorded in the circuit 28 in correspondence with the reception number printed and output in the step S74, and the flow returns to the step S46 in FIG. 2.

Figure 4:
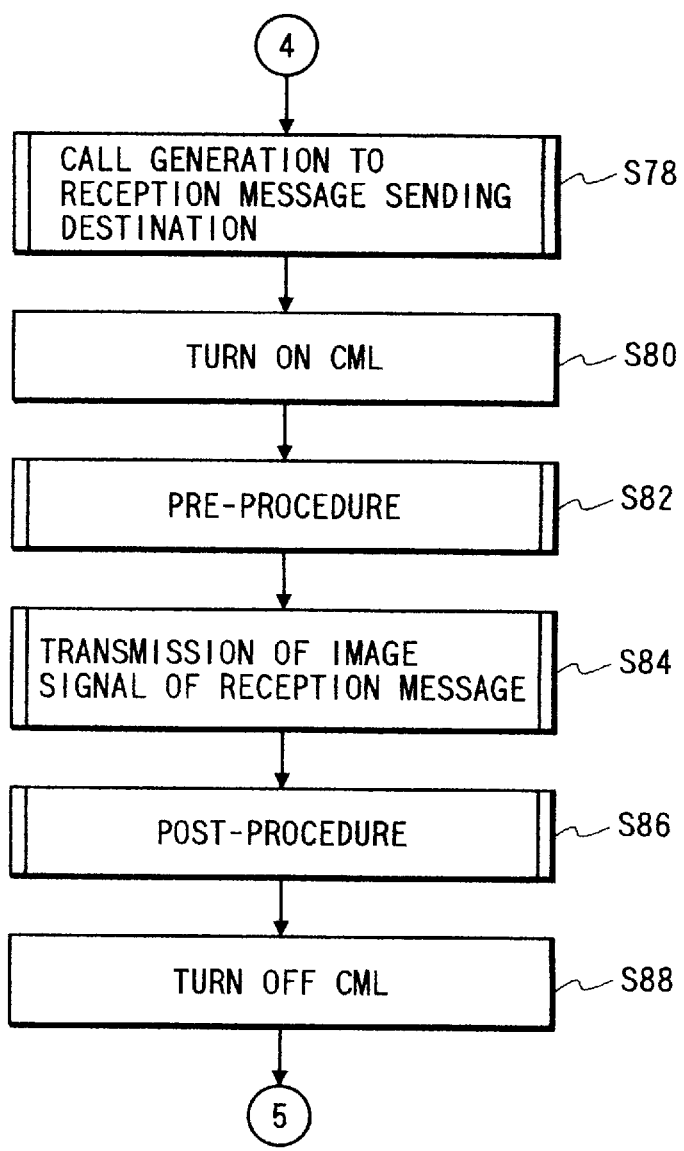
FIG. 4 is a flow chart of a process of the first embodiment which is performed by the control circuit illustrated in FIG. 1.
Figure 5:
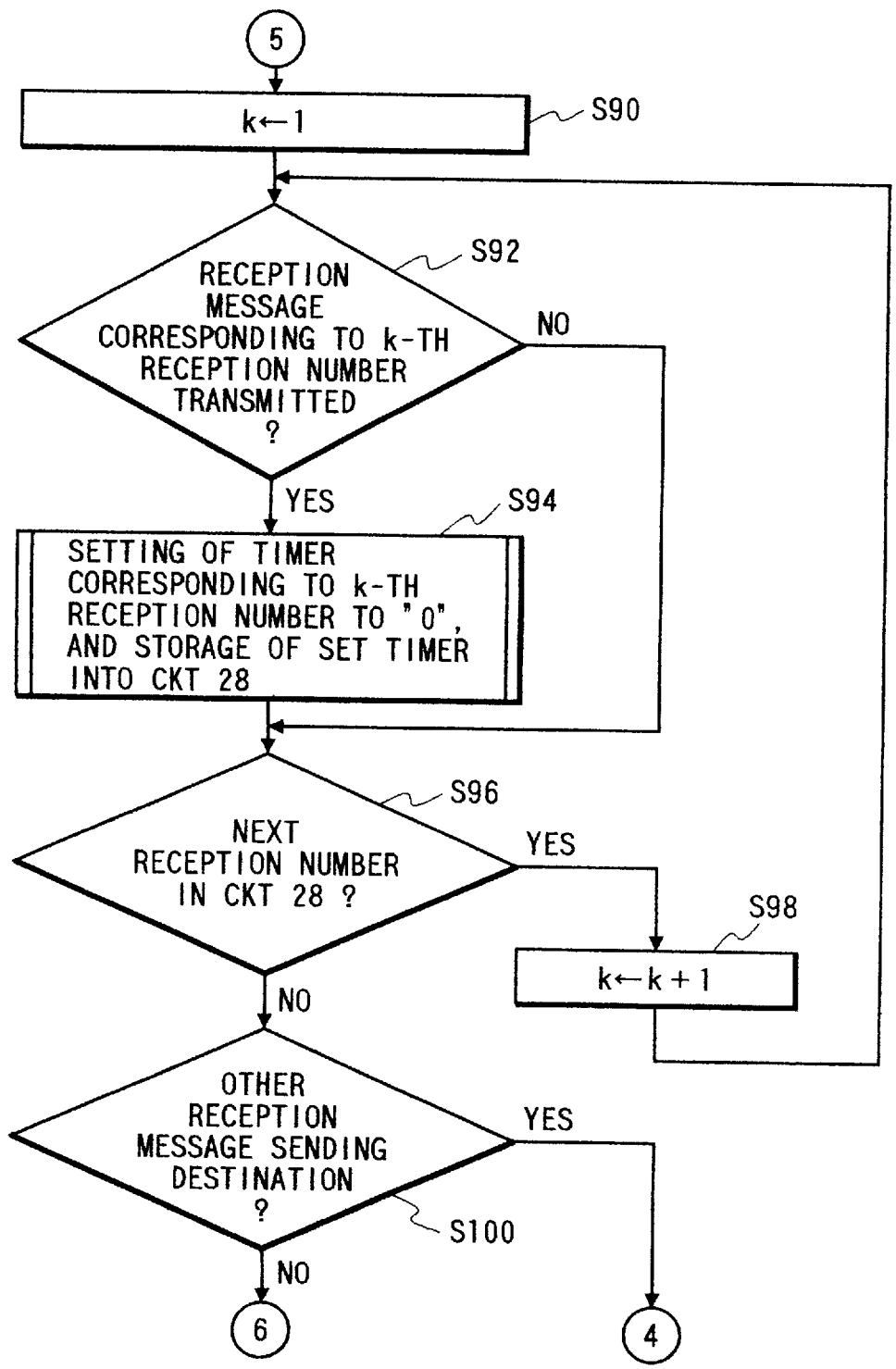
FIG. 5 is a flow chart of a process of the first embodiment which is performed by the control circuit illustrated in FIG. 1.

In the step S78 in FIG. 4, the destination to which the reception message is sent is read out of the circuit 28, and a call is generated to such the destination. In a step S80, the signal of which level is "1" is output to the signal line 20a to turn on the CML.

In a subsequent step S82, the pre-procedure is executed in accordance with the ITU-T Recommendations T.30. In a step S84, an image signal representing the reception message is transmitted. In this case, if the reception number of which memory-received information could be read and printed out and which was a chance of generating the reception message at the destination called in the step S78 (concretely, the timer value comes to be "0" or reaches the time TW recorded in the circuit 28), and the reception number at the same destination in which the timer value does not come to be "0" (i.e., does not reach the time TW) are not recorded in the circuit 28, it is simultaneously transmitted to the destination the reception message representing that the reception for these reception numbers were normally performed.

In a subsequent step S86, the post-procedure is executed. Then, in a step S88, the signal of which level is "0" is output to the signal line 20a to turn off the CML, and then the flow advances to a step S90 in FIG. 5.

In the step S90, "1" is set into a counter k. Then, in a step S92, it is judged whether or not the reception message was transmitted to the transmission-side apparatus corresponding to the k-th reception number in the circuit 28. If transmitted, the flow advances to a step S94 to set as "0" the value of the timer which counts the time TW and corresponds to the k-th reception number, and store it into the circuit 28. On the other hand, if not transmitted, the flow advances to a step S96.

In the step S96, it is judged whether or not there is the next reception number in the circuit 28. If there is the next reception number, the flow advances to a step S98 to subject the value of the counter k to increment by "1" and then returns to the step S92. On the other hand, if there is no next reception number, the flow advances to a step S100 to judge whether or not there is other destination to which the reception number is transmitted. If there is other destination, the flow advances to the step S78, while if there is no other destination, the flow advances to the step S44.

Figure 6:
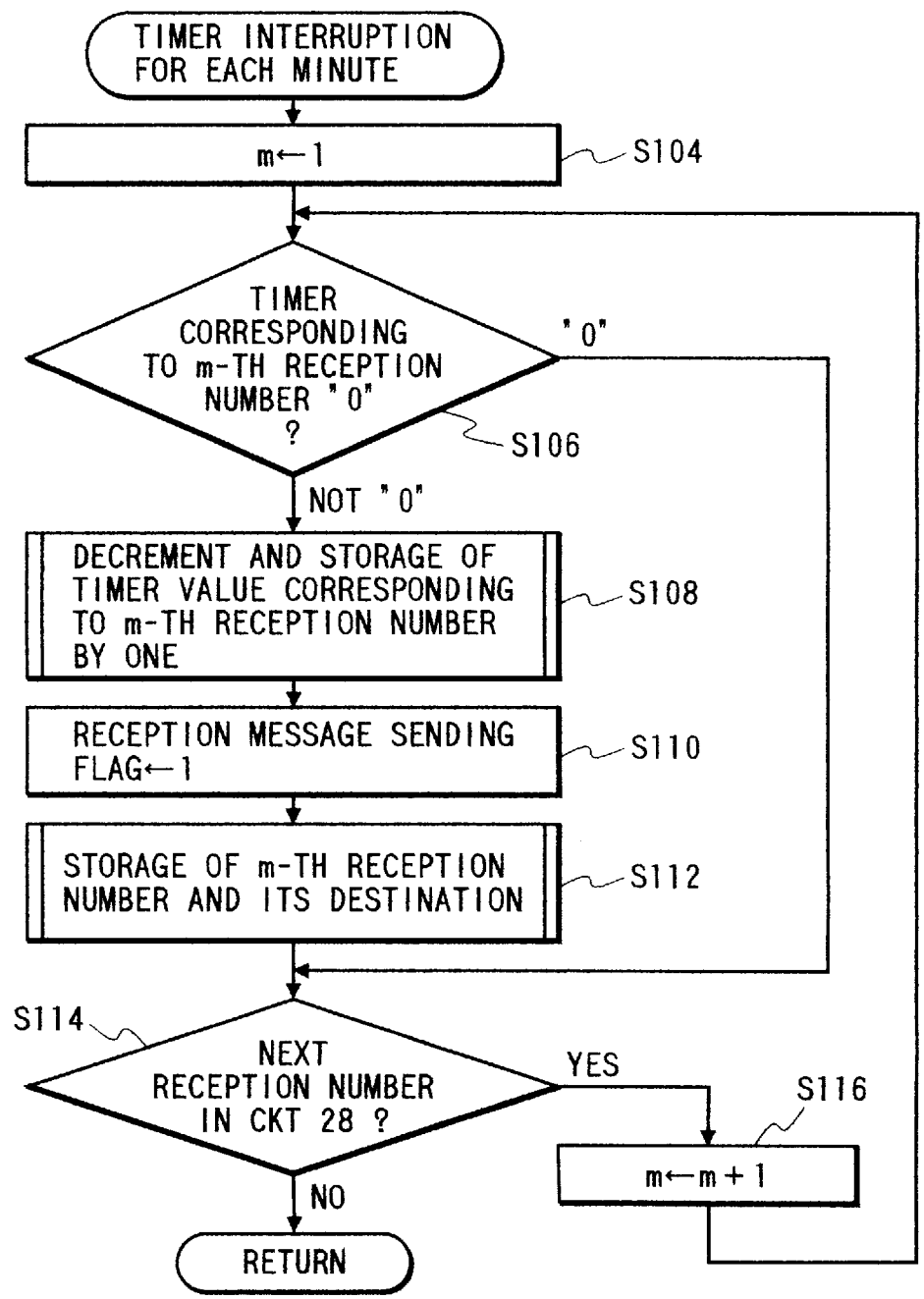
FIG. 6 is a flow chart of a process of the first embodiment which is performed by the control circuit illustrated in FIG. 1.

FIG. 6 is a flow chart showing a timer interruption process for each minute.

In a step S104, "1" is set into a counter m. Then, in a step S106, it is judged whether or not the value of the timer corresponding to the m-th reception number in the circuit 28 is "0". If "0", the flow advances to a step S114. On the other hand, if not "0", the flow advances to a step S108 to subject the timer value corresponding to the m-th reception number in the circuit 28 to decrement by "1", i.e., by one minute, and to record it. Then, in a step S110, "1" is set into the reception message sending flag, and in a step S112, the m-th reception number and the destination corresponding to such the reception number are stored, and thereafter the flow advances to the step S114.

In the step S114, it is judged whether or not there is the next reception number in the circuit 28. If there is the next reception number, the flow advances to a step S116 to subject the value of the counter m to increment by "1", and then the flow returns to the step S106. On the other hand, if there is no next reception number, the flow returns to the main routine shown in FIGS. 2 to 5.

As described above, in the present embodiment, in a case where the plurality of information were received from the same transmission-side apparatus, when the reception confirmation notification (i.e., reception message) corresponding to the first information is transmitted, the reception confirmation notification corresponding to other information which were received from such the transmission-side apparatus and have been already printed and output are collectively transmitted. Therefore, the number of call generation can be reduced, whereby a communication cost can be reduced and also line efficiency can be improved.

Second Embodiment

The present embodiment shows a case where also the communication unit B 32 is used in FIG. 1 to hold the two lines.

Figure 7:
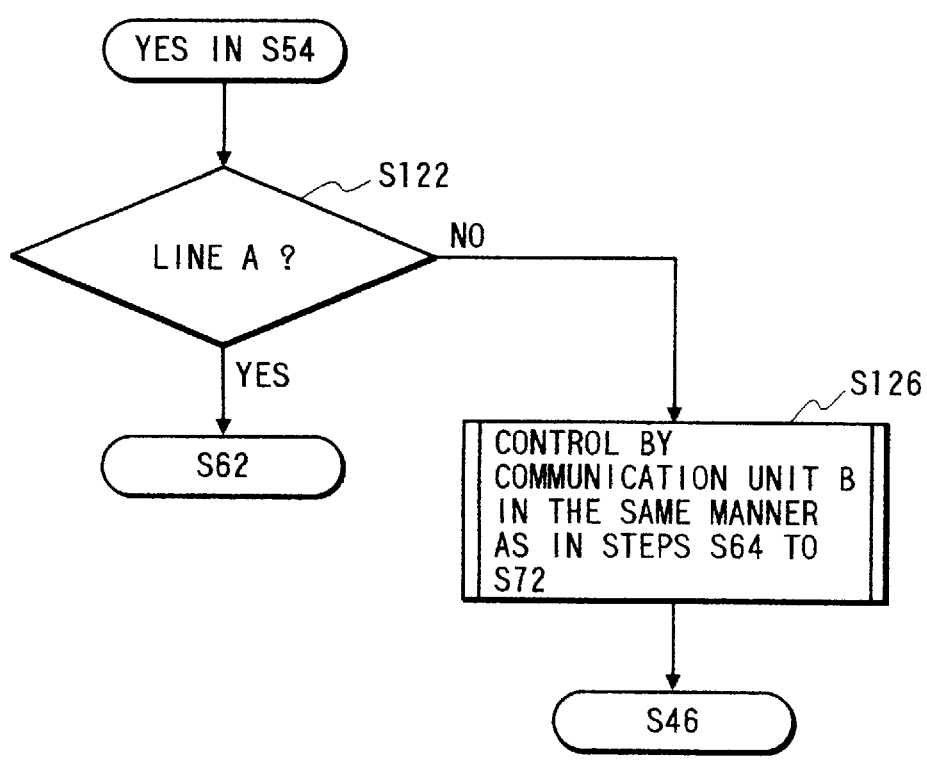
FIG. 7 is a flow chart of a process of a second embodiment which is different from the process of the first embodiment.

In the present embodiment, a step S122 shown in FIG. 7 is inserted between the steps S54 and S62 in FIG. 2. In the step S122, it is judged whether or not there is the reception from the line of the communication unit A, i.e., from the signal line 2a. If there is the reception from the line of the communication unit A, the flow advances to the step S62 in FIG. 2. On the other hand, if there is the reception from the line of the communication unit B, i.e., from the signal line 32a, the flow advances to a step S126 shown in FIG. 7.

Figure 3:
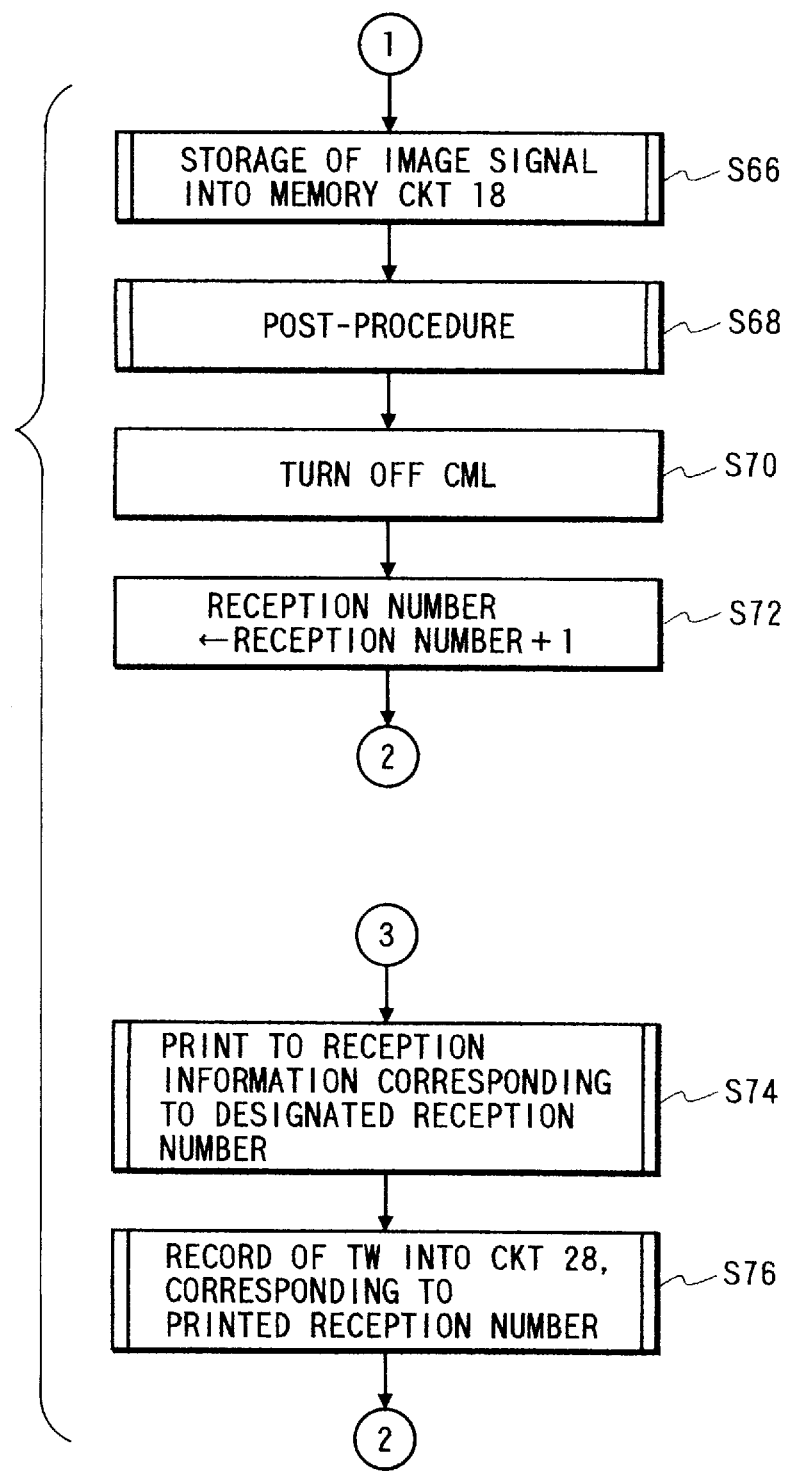
FIG. 3 is a flow chart of a process of the first embodiment which is performed by the control circuit illustrated in FIG. 1.

In the step S126, the same processes as those in the step S64 in FIG. 2 to the step S72 in FIG. 3 are performed by the communication unit B, and then the flow returns to the step S46 in FIG. 2.

The processes other than the above-described processes are the same as those in the first embodiment, whereby the explanation thereof will be omitted in the present embodiment.

In such a case where the two lines are held as in the present embodiment, there are a number of chances of receiving the plurality of information from the same transmission-side apparatus for a short period of time, whereby an effect of reducing the communication cost becomes more remarkable.

Third Embodiment

The present embodiment shows a case where the reception message is not transmitted from a time A to a time B, on the basis of the information previously registered in the circuit 26.

Figure 8A:
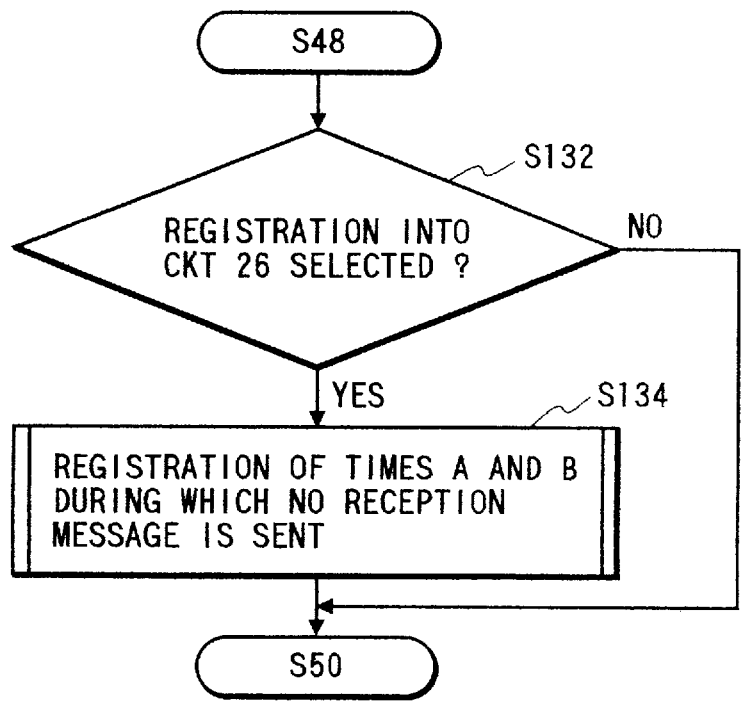
FIGS. 8A and 8B are flow charts of a process of a third embodiment which is different from the process of the first embodiment.
Figure 8B:
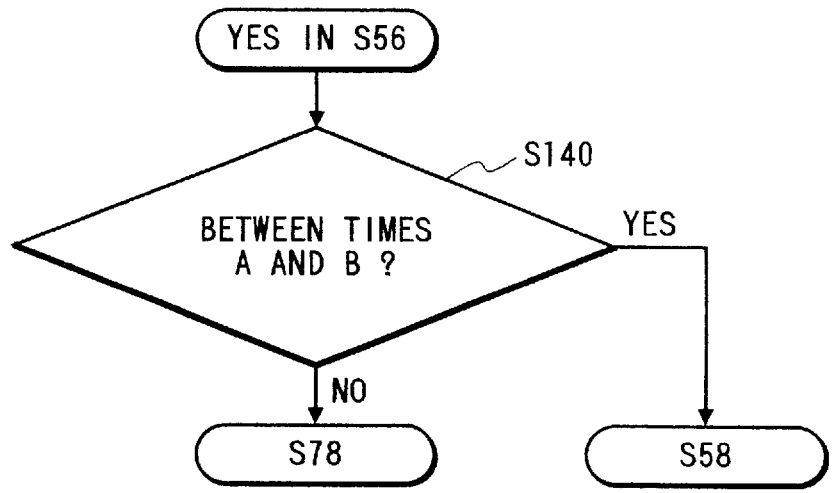

Concretely, in the present embodiment, steps S132 and S134 shown in FIG. 8A are inserted between the steps S48 and S50 in FIG. 2, and a step S140 shown in FIG. 8B is inserted between the step S56 in FIG. 2 and the step S78 in FIG. 4.

In the step S132 shown in FIG. 8A, it is judged whether or not the times A and B during which the reception message is not transmitted are selected, on the basis of the information output from the signal line 30a. If selected, the flow advances to the step S134 to register the times A and B into the circuit 26. On the other hand, if not selected, the flow advances to the step S50.

Further, in the step S140 shown in FIG. 8B, the information registered in the circuit 26 is checked, and it is judged whether or not the time of checking is in the period from the time A to the time B. If the time of checking is in such the period, the flow advances to the step S58, while if the time of checking is not in such the period, the flow advances to the step S78.

The processes other than the above-described processes are the same as those in the first embodiment.

According to the present embodiment, on the basis of the information registered into the circuit 26, for example, the reception message is not transmitted from 11 p.m. to 6 a.m., and then the reception messages are collectively transmitted after 6 a.m., whereby efficiency in communication cost reduction comes to be increased. Further, a side which receives the reception messages can receive them collectively, whereby such the side can easily manage these messages.

Fourth Embodiment

The present embodiment shows a case, when the transmission-side apparatus transmitted the data in a timer transmission, if all the reception are based on the timer transmission from the transmission-side apparatus, the reception message is not transmitted from the time A to the time B, while if at least one reception is not based on the timer transmission, the reception message is transmitted irrespective of any time or period.

Figure 9A:
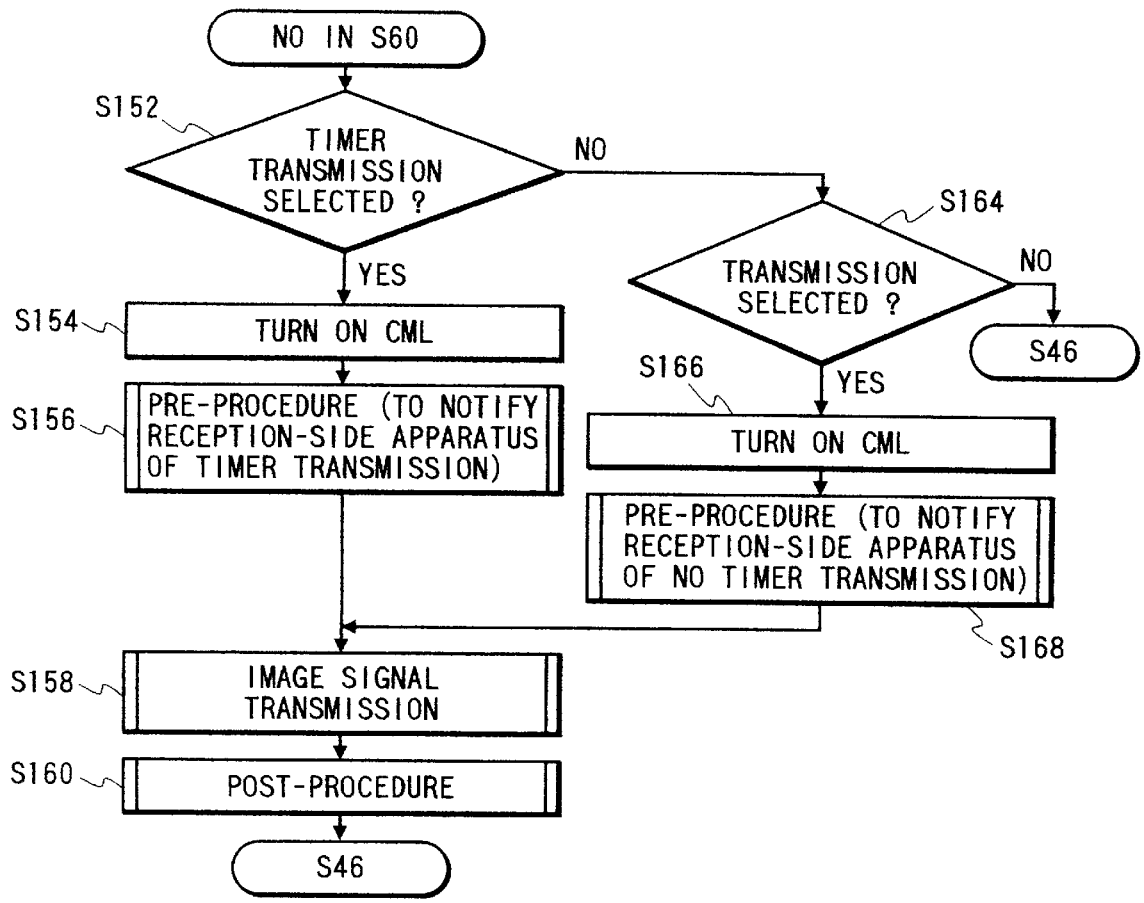
FIGS. 9A and 9B are flow charts of a process of a fourth embodiment which is different from the process of the first embodiment.
Figure 9B:
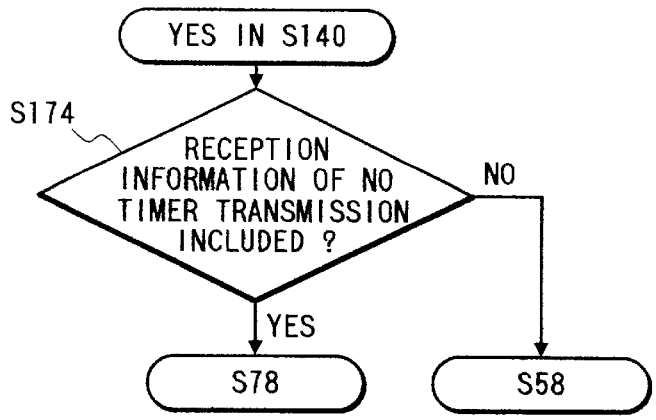

Concretely, in the present embodiment, processes shown in FIG. 9A are inserted between the steps S60 and S46 in FIG. 2, and a process shown in FIG. 9B are inserted between the step S140 in FIG. 8B and the step S58 in FIG. 2.

FIG. 9A shows the processes in the transmission-side apparatus.

In a step S152, it is judged whether or not the timer transmission is selected. If selected, the flow advances to a step S154, while if not selected, the flow advances to a step S164.

In the step S154, the signal of which level is "1" is output to the signal line 20a to turn on the CML. Then, in a step S156, the pre-procedure is executed. At this time, a reception-side apparatus is notified of the timer transmission, by using an NSS signal.

In a subsequent step S158, the image signal is transmitted. Then, in a step S160, the post-procedure is executed, and the flow advances to the step S46 in FIG. 2.

On the other hand, in the step S164, it is judged whether or not the transmission was selected. If selected, the flow advances to a step S166, while if not selected, the flow advances to the step S46 in FIG. 2.

In the step S166, the signal of which level is "1" is output to the signal line 20a to turn on the CML. Then, in a step S168, the pre-procedure is executed, and the flow advances to the step S158. At this time, the reception-side apparatus is notified of no timer transmission, by using the NSS signal.

FIG. 9B shows the processes in the reception-side apparatus.

In a step S174, it is judged based on the received NSS signal whether or not the reception information not based on the timer transmission is included in the data received from the same transmission-side apparatus. If included, the flow advances to the step S78 in FIG. 4. On the other hand, if all the reception information are based on the timer transmission, the flow advances to the step S58 in FIG. 2.

Further, in the present embodiment, in the step S64 shown in FIG. 2, the transmission destination of the reception message and the result of judging whether or not the timer transmission is selected are also stored in correspondence with the reception number.

The processes other than the above-described processes are the same as those in the third embodiment.

According to the present embodiment, the period (from time A to time B) during which the reception message is not transmitted is applied only to the data transmitted in the timer transmission in which there is a possibility of no user at the transmission-side apparatus. On the other hand, in a case where there is even one reception data not based on the timer transmission, the reception message is transmitted irrespective of any time or period, whereby operationability can be more improved.

In the third or fourth embodiment, the reception data stored in the memory is read and the print output is selected, and then the reception message is transmitted after elapsing a predetermined period of time from the print output termination time. However, the present invention is not limited to such the embodiment. That is, the reception data may be immediately and directly printed and output, and the reception message may be transmitted after elapsing a predetermined period of time from a print output termination time.

Further, in the above-described embodiments, when the data which was received from the transmission-side apparatus is visibly printed on the recording paper by the recorder circuit 16, at that time the reception is judged to have been normally performed, and thus the reception message is transmitted to the transmission-side apparatus. However, the present invention is not limited to such the embodiments.

For example, the reception may be judged to have been normally performed at the time when the reception data is read out of the memory to be displayed on a display or the like, when the reception data is stored in a nonvolatile memory, or the like. That is, such judgment is possible at the time when the user in the reception side surely confirmed the contents of the received data or when it becomes a state that the user can surely confirm such the contents.

Furthermore, as the reception message to be transmitted to the transmission-side apparatus, the predetermined-format image (including the message that the reception was normally performed) has been stored in the memory circuit 18. Then, the data such as each reception time, the telephone number of the reception-side apparatus, the number of pages in each reception, and the like were added to the reception message and thereafter the obtained message is transmitted.

According to the above-described embodiments of the present invention, when the information corresponding to the plural-time communications are received from the same transmission-side apparatus, the reception message confirmation notification responsive to these plural-time communications can be performed at one time, whereby the communication cost can be reduced.

Further, by reducing the number of call generations, the use efficiency of the line can be improved. Moreover, by performing the image information reception and the reception message transmission respectively on the basis of different calls, the use efficiency of the line can be also improved.

Furthermore, by collectively transmitting the plurality of reception messages, the user at the side of receiving the reception messages can easily manage them.

The present invention can be applied to a system constructed by a plurality of equipments (e.g., host computer, interface equipment, reader, printer and the like) or can be also applied to an apparatus comprising one equipment (e.g., copy machine, facsimile machine).

The invention employed by a method whereby program codes of a software to realize the functions of the foregoing embodiments are supplied to a computer in an apparatus or a system connected to various devices so as to make the devices operative in order to realize the functions of the foregoing embodiments and the various devices are operated in accordance with the programs stored in the computer (CPU or MPU) of the system or apparatus in also included in the scope of the present invention.

In such a case, the program codes themselves of the software realize the functions of the foregoing embodiments and the program codes themselves and means for supplying the program codes to the computer, for example, a memory medium in which the program codes have been stored construct the present invention.

As such a memory medium to store the program codes, for example, it is possible to use a floppy disk, a hard disk, an optical disk, an optomagnetic disk, a CD-ROM, a magnetic tape, a nonvolatile memory card, a ROM or the like can be used.

It will be obviously understood that the program codes are included in the embodiments of the present invention even in not only a case where the functions of the foregoing embodiments are realized by executing the supplied program codes by the computer but also a case where the functions of the foregoing embodiments are realized in cooperation with the OS (operating system) by which the program codes operate in the computer or another application software or the like.

Further, it will be also obviously understood that the present invention also incorporates a case where the supplied program codes are stored into a memory provided for a function expansion board of a computer or a function expansion unit connected to a computer and, after that, a CPU or the like provided for the function expansion board or the function expansion unit executes a part or all of the actual processes on the basis of instructions of the program codes, and the functions of the foregoing embodiments are realized by the processes.

Although the present invention has been described above with respect to the preferred embodiments, the present invention is not limited to the foregoing embodiments but many modifications and variations are possible with the spirit and scope of the appended claims.

What is claimed is:

1. A data communication apparatus comprising:
   reception means for receiving data transmitted from a transmission side in one of a plurality of transmission modes;
   determination means for determining which of the plurality of transmission modes was used to transmit the received data;
   transmission means for transmitting information representing that said reception means received the data, to the transmission side;
   discrimination means for discriminating a condition on which the information should be transmitted by said transmission means, the condition varying in accordance with which transmission mode was determined by said determination means; and
   control means for controlling said transmission means to transmit collectively information corresponding to reception data of a plurality of receptions by said reception means, on the basis of the condition discriminated by said discrimination means.

2. An apparatus according to claim 1, wherein the condition discriminated by said discrimination means relates to a time.

3. An apparatus according to claim 2, wherein said transmission means transmits the information which becomes transmittable within a predetermined period of time.

4. An apparatus according to claim 1, further comprising output means for outputting the data received by said reception means, and
   wherein said discrimination means discriminates that the data was output by said output means.

5. An apparatus according to claim 1, further comprising setting means for setting a period in which the transmission by said transmission means is made effective, and
   wherein said transmission means transmits the information in the period set by said setting means.

6. An apparatus according to claim 1, wherein the data reception by said reception means and the transmission by said transmission means are performed respectively in different communications.

7. An apparatus according to claim 6, wherein said transmission means transmits the information after a call is generated to a destination of the transmission side which transmitted the data received by said reception means.

8. A computer readable storage medium storing a program for causing a data communication apparatus to perform a method, said method comprising:

a reception step of receiving data transmitted from a transmission side in one of a Plurality of transmission modes;
   a determination step of determining which of the plurality of transmission modes was used to transmit the received data;
   a transmission step of transmitting information representing that the data was received in said reception step, to the transmission side;
   a discrimination step of discriminating a condition on which the information should be transmitted in said transmission step, the condition varying in accordance with which transmission mode was determined in said determination step; and
   a control step of controlling said transmission step to transmit collectively information corresponding to reception data of a plurality of receptions in said reception means, on the basis of the condition discriminated in said discrimination step.

9. An apparatus according to claim 1, wherein the plurality of transmission modes includes a regular transmission mode and a timer transmission mode.

10. A method operative in a data communication apparatus, said method comprising:
    a reception step of receiving data transmitted from a transmission side in one of a plurality of transmission modes;
    a determination step of determining which of the plurality of transmission modes was used to transmit the received data;
    a transmission step of transmitting information representing that the data was received in said reception step, to the transmission side;
    a discrimination step of discriminating a condition on which the information should be transmitted in said transmission step, the condition varying in accordance with which transmission mode was determined in said determination step; and
    a control step of controlling said transmission step to transmit collectively information corresponding to reception data of a plurality of receptions in said reception means, on the basis of the condition discriminated in said discrimination step.

11. A method according to claim 10, wherein the plurality of transmission modes includes a regular transmission mode and a timer transmission mode.

12. A data communication apparatus comprising:
    reception means for receiving data from a transmission side in one of a plurality of transmission modes;
    determination means for determining which of the plurality of transmission modes was used to transmit the received data;
    transmission means for transmitting information representing a result of processing the data received by said reception means, to the transmission side; and
    control means for controlling said transmission means to vary a transmission method of said transmission means, on the basis of which mode was determined by said determination means.

13. An apparatus according to claim 12, wherein the plurality of transmission modes includes a regular transmission mode and a timer transmission mode.

14. An apparatus according to claim 12, wherein said transmission means transmits the information by using either a first transmission method in which transmission of the information is inhibited within a predetermined time, or a second transmission method in which transmission of the information is executed independently of the predetermined period of time.

15. An apparatus according to claim 12, where said transmission means collectively transmits information corresponding to reception data of a plurality of receptions by said reception means.

16. An apparatus according to claim 12, wherein the information represents whether the data received by said reception means was output normally.

17. A method operative in a data communication apparatus, said method comprising:

a reception step of receiving data from a transmission side in one of a plurality of transmission modes;

a determination step of determining which of the plurality of transmission modes was used to transmit the received data;

a transmission step of transmitting information representing a result of processing the data received in said reception step, to the transmission side; and a control step of controlling said transmission step to vary a transmission method of said transmission step, on the basis of which mode was determined in said determination step.

18. A computer readable storage medium storing a program for causing a data communication apparatus to perform a method, said method comprising:

a reception step of receiving data from a transmission side in one of a plurality of transmission modes;

a determination step of determining which of the plurality of transmission modes was used to transmit the received data;

a transmission step of transmitting information representing a result of processing the data received in said reception step, to the transmission side; and a control step of controlling said transmission step to vary a transmission method of said transmission step, on the basis of which mode was determined in said determination step.

* * * * *

UNITED STATES PATENT AND TRADEMARK OFFICE
CERTIFICATE OF CORRECTION

PATENT NO. : 5,890,806
DATED : April 6, 1999
INVENTOR(S) : TAKEHIRO YOSHIDA

It is certified that error appears in the above-identified patent and that said Letters Patent is hereby corrected as shown below:

<u>COLUMN 10</u>

Line 2, "Plurality" should read --plurality--.

Signed and Sealed this

Sixteenth Day of November, 1999

Attest:

Q. TODD DICKINSON

*Attesting Officer*  *Acting Commissioner of Patents and Trademarks*